Feb. 23, 1965     R. P. HAMMOND     3,170,843
PASTE REACTOR
Filed Oct. 26, 1962     5 Sheets-Sheet 5
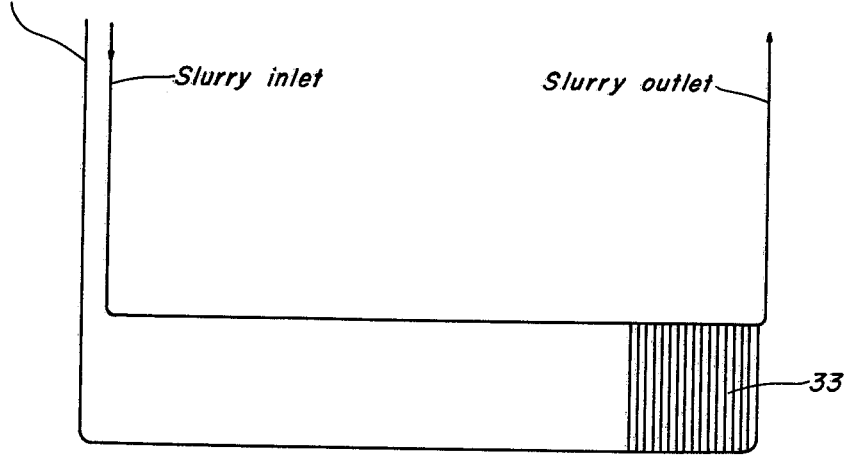
Fig. V
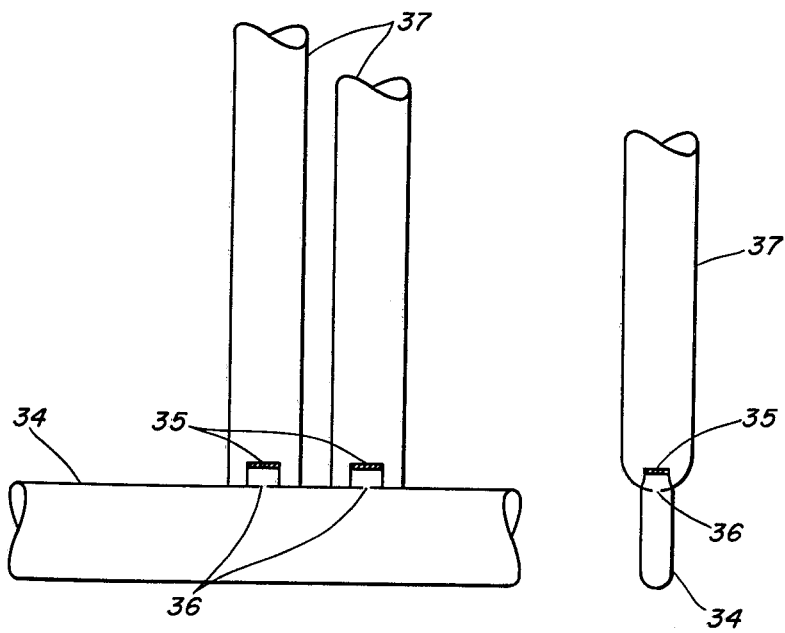
Fig. VI
INVENTOR.
Roland Philip Hammond
BY 3,170,843
PASTE REACTOR
Roland Philip Hammond, Los Alamos, N. Mex., assignor to the United States of America as represented by the United States Atomic Energy Commission
Filed Oct. 26, 1962, Ser. No. 233,496
3 Claims. (Cl. 176—18)

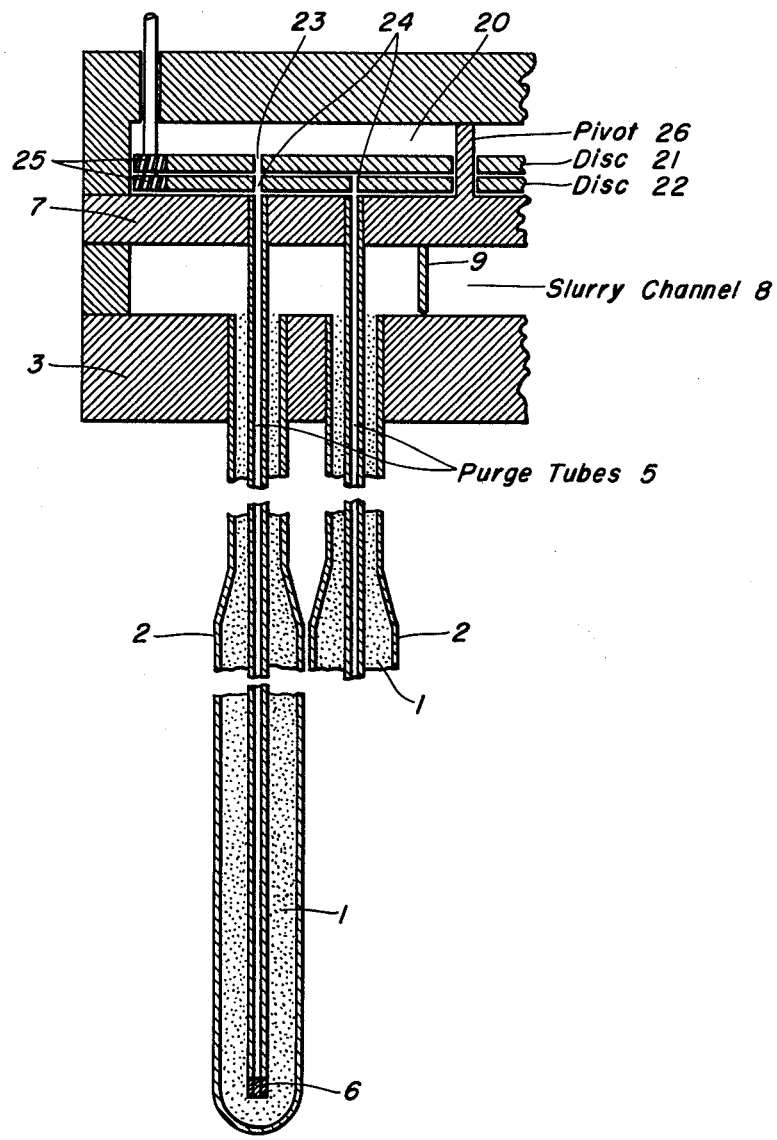
Fig. I

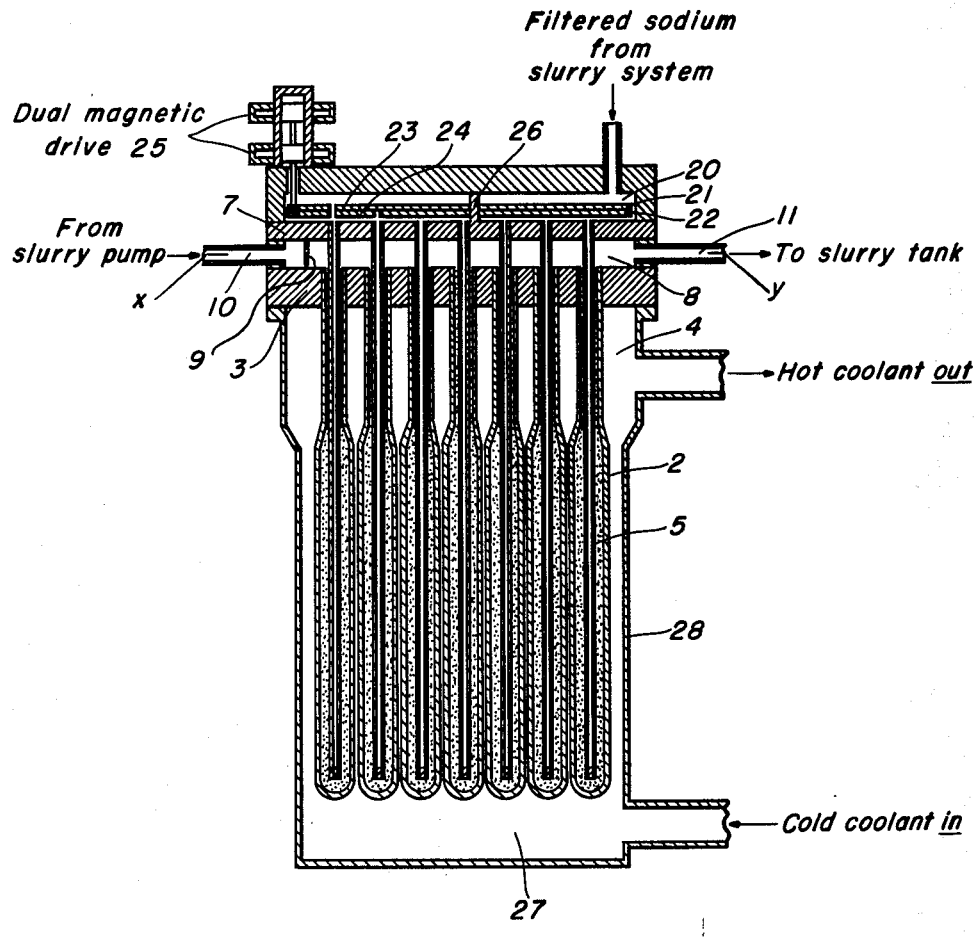
Fig. II

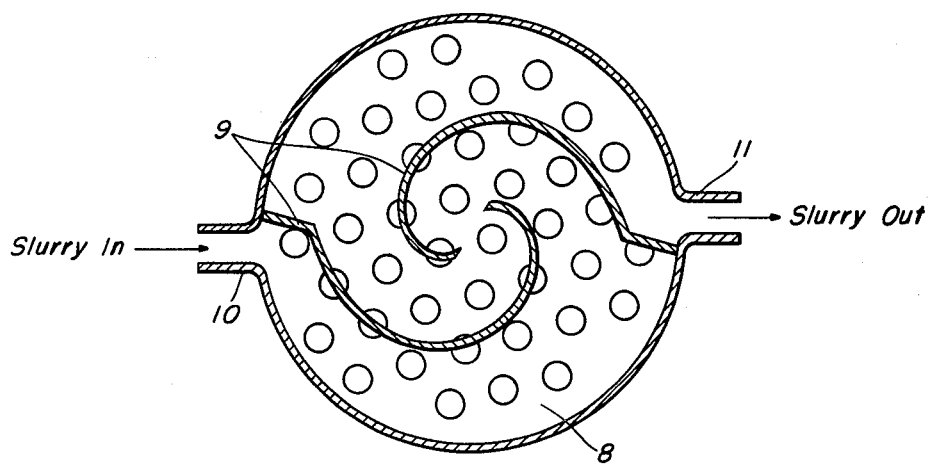
Fig. III

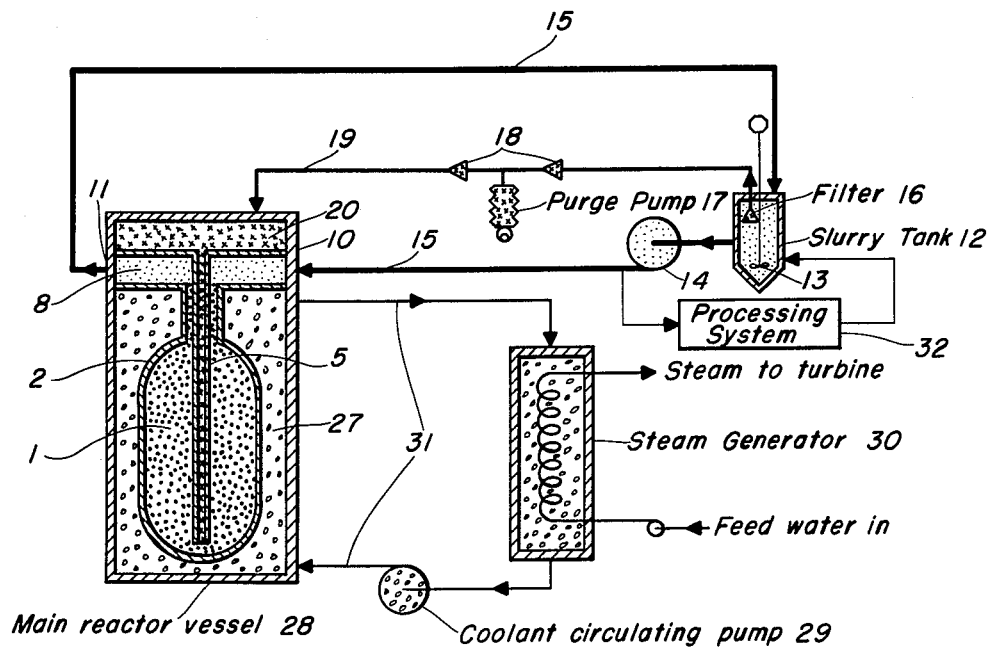
Fig. IV

This invention relates to a method and apparatus for producing nuclear power and more specifically to a fast neutron breeder reactor utilizing a paste fuel of uranium-containing particles in liquid metal.

In a fast neutron breeder reactor it is necessary to provide a fertile blanket surrounding a chain reacting core, or to combine fertile and fissionable isotopes into a one-region, chain reacting and breeding system. The present invention provides a reactor system in which only fertile material need be supplied after initial start-up, and within which the necessary movement and processing of fertile and fuel materials can be done and controlled without interrupting the operation of the reactor. The form of fuel used in this invention is a paste of uranium-containing particles in liquid metal. The particles may be composed of uranium metal, an alloy of uranium, or a ceramic body or compound containing uranium such as uranium-dioxide or uranium-carbide. In positions of the reactor where fissionable atoms are required, the uranium particles could contain plutonium as well. This liquid metal could be of any of the class of alkali metals, or bismuth, or gallium; however, sodium is the preferred metal and is used for purposes of discussion throughout this specification. The use of paste as a fuel has been proposed in the past but the methods of moving, loading, and unloading and processing have required cumbersome and unreliable structures using uranium particles of a large size and dependent upon certain unproved rheological properties of the paste. The method and apparatus of the present invention depends to a much lesser extent upon specific flow properties of the paste and can utilize very fine particles which are more stable in a radiation field. In addition, the method permits continuous operation of the reactor with multiple fuel zones, and control of processing to obtain the most favorable nuclear performance. This invention permits close control of the density of the fuel in the paste, providing a reactor of higher inherent safety than the paste reactors of the previous art.

The present invention involves a reactor and fuel system which is comprised of the following means: (1) means of circulating a dilute slurry of fuel particles through a plenum in the reactor, (2) means for preventing excessive settling of particles in said plenum, (3) means connected with said plenum for causing solid particles to be diverted from said slurry and to settle in dense settled form in chambers connected to said settling means, (4) means for externally cooling said chambers, (5) means attached to said chambers for controllably introducing filtered slurry liquid to the bottom of said settled particles in said chambers, (6) fuel processing means connected to said circulating means.

It is therefore an object of this invention to provide a reactor system in which only fertile material need be supplied after initial start-up and within which the necessary movement and processing of fertile and fuel materials can be done without interrupting the operation of the reactor.

Another object of this invention is to provide a reactor fuel system which can be loaded and unloaded using a paste containing fissile element in fine particle form.

Other objects of the present invention will be apparent from the accompanying drawings which are hereby made a part of this specification.

FIGURE I is a longitudinal sectional view of a fuel container and its purge tube.

FIGURE II is a longitudinal sectional view of a preferred embodiment of this invention showing a section of the reactor.

FIGURE III is a horizontal sectional view taken on the line $x$—$y$ of FIGURE II.

FIGURE IV is a schematic diagram of the reactor system showing the associated processing and cooling systems.

FIGURE V is a side view of a flat rack of fuel tubes.

FIGURE VI is an enlarged section and end view of the fuel tubes and backwash inlet of FIGURE V.

As shown in FIGURE I, the paste fuel is contained in a plurality of tubes 2 which are closed at the bottom and are connected to a tube sheet or header 3 at the top. They are preferably but not necessarily constricted to smaller diameters for a sufficient length near the top to form a plenum for the coolant outlet. Inside each fuel tube is a purge tube 5 terminating near the bottom of the fuel tube and closed by a filter 6. The purge tubes are connected at the upper end to a second tube sheet 7 located above the first tube sheet 3 and spaced therefrom to form a channel 8. Channel 8 is subdivided by vertical partitions 9 and is arranged so as not to conflict with the purge tubes 5 which pass through the same region.

FIGURE II shows a section of the reactor and more specifically points out individually rotatable discs 21, 22 containing ports 23, 24 and equipped with drive mechanism 25 and pivot 26. The ports 23, 24 in discs 21, 22 are arranged so that suitable rotation of the discs will place ports in both discs in line with one fuel tube only, or a suitably small group of fuel tubes.

FIGURE III shows channel 8 subdivided by vertical partitions 9 to form a dual involute spiral channel from the slurry inlet 10 to the slurry outlet 11. As noted in the description of FIGURE I above, the partitions are thin enough on their lower edge to avoid blocking the entrances to the said fuel tubes.

FIGURE IV shows the complete reactor circulating system in which a dilute slurry of fuel in excess sodium is circulated by pump 14 through inlet 10, channel 8, and the spent fuel is returned through outlet 11 to the slurry tank 12 through connecting piping 15. Means are provided for supplying filtered sodium, free from particles, under pressure to each purge tube, comprising an agitator 13 and a filter 16 in the slurry tank 12, a positive displacement, controlled discharge pump 17 and check valve 18, connective piping 19 and purge channel 20. The heat of fission generated in fuel paste 1 is removed by coolant 27 contained in vessel 28, and flowing past tubes 2 in any suitable manner but preferably upwards. The coolant is circulated and cooled by a suitable system which is not a part of this invention but is represented schematically by pump 29, steam generator 30, piping 31 and processing system 32.

FIGURE V is another embodiment of this invention and it shows a flat rack of fuel tubes 33 which are loaded or charged by pumping a uranium fuel slurry into the slurry inlet and then into the fuel tubes. The fuel is purged of fissionable gas and reaction products by injecting sodium into the backwash inlet which is connected by a passage to the fuel tubes, thus flushing the slurry out the said slurry outlet. The flat rack can be shaped or curved to fit within a circular reactor vessel if desired.

FIGURE VI is an enlarged fractional sectional view of FIGURE V showing the backwash tube 34, filter 35, and fuel tubes 37. Sodium is pumped into the backwash tube where it passes through the aperture 36 and the filter 35 into the fuel tube 37 containing the uranium slurry. The sodium flow is such that it causes the fuel slurry to be flushed out the slurry outlet. A similar means of reprocessing and recirculating the fuel slurry as used in the preferred embodiment can then be used.

A preferred embodiment of the present invention is represented in the following description: The core region has approximately 2800 fuel tubes made of stainless steel approximately .78" O.D. and .75" I.D., 65" long in the core region and extended 15" in the plenum region, where the O.D. is .410" and the I.D. is about .375". These fuel tubes are attached to a tube sheet to form a core region about 51" in diameter, with the fuel tubes spaced about .9" apart on triangular centers. In the center of the tube sheet enough tubes are omitted to substitute a circular tube 6" in diameter to house a control element. The 6" tube extends downward from the tube sheet and out through the bottom of the coolant vessel. A cylinder of solid nickel is arranged to slide freely in this tube, filling the center of the core region. The cylinder is supported so that it may quickly be dropped to a position out of the core region when desired, and slowly restored at will.

Surrounding the core tubes, and attached to the same tube sheet, are approximately 770 blanket tubes, approximately 2" I.D. and spaced on 2.4" triangular centers to form a blanket region about 87" O.D. and 51" I.D. The blanket tubes are the same length as the core fuel tubes. The tube sheet forms the bottom of the slurry plenums for both the blanket and core systems. A circular divider extending from the tube sheet to an upper tube sheet, a distance of about 2", forms a barrier between the two slurry systems. Each plenum region also has a spiral divider, as described before. The upper tube sheet carries the purge tubes, which are about .125" I.D. and extend to near the bottom of each fuel and blanket tube. They are arranged to be individually supplied with high pressure sodium, as described above.

The fuel in the core region consists of particles of uranium dioxide containing about 15% by weight of plutonium dioxide. The particles are about 15 microns in diameter and are suspended in pure sodium in the slurry region and settle to about 50% solids by volume in the core region, except when being purged. The blanket material is similar except that it is initially free from plutonium.

The core and blanket fuel tubes are enclosed by a stainless steel coolant enclosure tank attached to the main tube sheet and provided with suitable inlet and outlets for the coolant sodium. The coolant is circulated upward past the tubes at about 35,000 gallons per minute. The coolant tank is provided on the outside with neutron reflecting material such as steel, nickel, or graphite, and with suitable shielding and insulation, such as are well known in the art. The coolant tank and all sodium piping must also be provided with means for warming the system to the melting point of sodium in order that the initial filling may take place.

The separate core and blanket slurry systems consist of conventional pumps, tanks, valves, and agitators, and may be of any suitable manufacture or size. A suitable rate of slurry circulation would be 100 gallons per minute for each system.

The method of operating the reactor and fuel system of this invention is as follows: The slurry system associated with each zone of the reactor is charged with pure sodium and fuel particles, and operated to circulate a dilute slurry over the tops of the fuel tubes. This will cause a small portion of the particles to be diverted into the tubes, where they will settle in the stagnant sodium. When all the tubes are filled with settled particles, or paste, the slurry system is flushed with filtered sodium.

The main coolant system of the reactor is placed in operation and the reactor started by manipulation of control devices in a well known manner. Fissions occurring in the fuel particles produce gaseous products which will escape from the particles into the sodium phase of the paste. If allowed to remain, the gas bubbles would destroy the heat transport properties of the fuel and would eventually displace fuel from the core, making the reactor subcritical. To prevent this difficulty, this invention provides the purge system described above, which operates as follows:

At frequent intervals determined by the rate of accumulation of gas bubbles in the paste, a few cubic centimeters of filtered sodium is introduced to the bottom of each fuel tube in turn by operation of pump 17, discs 21, 22, etc. (see FIGURE II). The operation of the purge system in this manner to introduce sodium to one tube at a time or a small group of tubes at a time will not perturb the normal operation of the reactor, and can be done while at power. The fuel particles just above the bubble of sodium thus introduced will settle through it to the bottom again, and in effect, the bubble rises through the paste until it reaches the top. Bubbles of fission gases present in the paste are thereby collected and transferred to the upper header, where they can be moved out of the reactor by passing a stream of sodium through the slurry manifolds. This continuous purging of gases from the fuel is an important feature of this invention, since it permits the use of small fuel particles which are more stable to the radiation in the reactor, and which would otherwise be rendered inoperative by the accumulation of gas and the lowering of fuel density.

On a much more infrequent schedule determined by the need for reprocessing of the fuel, the purge system is operated in a different manner to accomplish the discharge and replacement of the fuel particles as follows: Discharge of a fuel tube is effected by a continuous introduction of filtered sodium at the bottom of a tube or group of tubes, while operating the slurry system in order to wash away the paste which is discharged. In contrast to the gas purging mode of operation in which a single injeciton is made and re-settling occurs, the continuous injection does not permit settling to take place, and the settled bed is expanded, diluted, and finally washed out of the tube. The discharged tube or tubes are then recharged with paste from the slurry system as in the original startup. The operation can be done without interrupting the operation of the reactor if a sufficiently small fraction of the core is discharged at a time.

It is clear that the operator is facilitated by the apparatus of this invention in effecting several different types of refueling operations which may be beneficial under different circumstances. By selection of the tubes to be discharged and of those to be refilled the operator can, for example, move fuel from one zone of the reactor to another. He can, alternatively, remove fuel from one zone and replace it with reprocessed fuel. He can mix fuel from several zones and reload with the mixed composition. Most important of all, he can operate the system at constant composition, in which fuel is discharged into a circulating slurry system, reloaded from the same system, and the composition of the slurry is kept constant by continuously reprocessing a small portion and returning it to the system.

For clarity in the illustrations only a single zone of fuel tubes, one slurry system, and one purge system have been shown. It is obvious, however, and it is intended as an important feature of this invention, that the fuel system may be zoned or subdivided into any desired number of regions which may be furnished with separate slurry systems containing fuel of different compositions. For very large reactors efficient breeding can be obtained with only one fuel composition throughout, so that only one slurry system is needed. For smaller reactors better breeding is obtained if at least two concentric regions are provided, so that an outer region having fuel relatively deficient in plutonium surrounds and encloses an inner region containing fuel with greater plutonium content. It is also obvious that the diameter and spacing of fuel tubes may be varied at will in different regions of the reactor, in accordance with the expected rate of fission in each region. Thus a central region with high fuel enrichment would require more cooling and hence smaller fuel tubes. An outer blanket region with very little heat output would be suited for relatively large tubes of fuel and relatively smaller proportion of coolant.

As shown in FIGURES V and VI, many changes could be made in the preferred embodiment of this invention without departing from the scope thereof. It is intended that all matter contained in the above description or shown in the accompanying drawings shall be interpreted as illustrative and not in a limiting sense.

What is claimed is:

1. A fast neutron breeder reactor utilizing a paste slurry fuel of uranium comprising:
   (a) a coolant enclosure tank,
   (b) coolant inlet and outlet means connected in fluid communication to said tank,
   (c) a plurality of fuel tubes closed at the bottom and positioned vertically within said tank and connected to a first header at the top of said tank,
   (d) a plurality of purge tubes positioned inside of said fuel tubes, closed by a filter, and spaced from the wall of said fuel tubes,
   (e) a second header positioned above said first header and connected in fluid communication to said purge tubes,
   (f) valve means in said second header for allowing or preventing fluid communication between various combinations of said purge tubes and said second header,
   (g) slurry inlet and outlet means connected in fluid communication with said first header,
   (h) sodium inlet and outlet means connected in fluid communication with said second header,
   (i) processing means for said slurry,
   (j) piping means connecting said processing means to said slurry inlet and outlet means,
   (k) filter means in said processing means for removing sodium therefrom,
   (l) piping means connecting said filter means to said sodium inlet and outlet means, and
   (m) means connected to said coolant inlet and outlet means for removing the heat of fission generated in the reactor.

2. The reactor of claim 1 in which said means connected to said coolant inlet and outlet means for removing the heat of fission generated in the reactor is an external heat exchanger.

3. The reactor of claim 1 in which each fuel tube contains a purge tube within.

References Cited by the Examiner

UNITED STATES PATENTS

| 2,910,417 | 10/59 | Teitel | 75—122.5 |
| 3,041,263 | 6/62 | Kiehn et al. | 176—14 |
| 3,071,527 | 1/63 | Young | 176—83 |

FOREIGN PATENTS

| 773,343 | 4/57 | Great Britain. |

OTHER REFERENCES

Stanford: "A Fluid-Fueled Fast-Power-Reactor Concept," appearing at pp. 410–415 in The Metal Plutonium, edited by Coffinberry et al., 1961.

Teitel: Nucleonics, April 1956, (vol. 14, No. 4), pages 72–77.

CARL D. QUARFORTH, *Primary Examiner*.